(12) United States Patent
Schoenfeld et al.

(10) Patent No.: US 7,447,671 B2
(45) Date of Patent: Nov. 4, 2008

(54) CONFIGURATION OF A MEASUREMENT TEST ON A PROTOCOL TESTER

(75) Inventors: Christian Schoenfeld, Berlin (DE); Ute Wagner, Falkenrchde (DE); Mike Wiedemann, Falkensee (DE); Christian Zander, Berlin (DE)

(73) Assignee: Tektronix, Inc., Beaverton, OR (US)

( * ) Notice: Subject to any disclaimer, the term of this patent is extended or adjusted under 35 U.S.C. 154(b) by 739 days.

(21) Appl. No.: 10/692,503

(22) Filed: Oct. 24, 2003

(65) Prior Publication Data

US 2004/0153865 A1 Aug. 5, 2004

(30) Foreign Application Priority Data

Nov. 15, 2002 (EP) .................... 02025495

(51) Int. Cl.
*G06N 5/00* (2006.01)
(52) U.S. Cl. .................... 706/60; 707/10; 709/224; 715/735
(58) Field of Classification Search .................... 706/60; 707/10; 709/224; 715/735
See application file for complete search history.

(56) References Cited

U.S. PATENT DOCUMENTS 5,694,596 A * 12/1997 Campbell .................... 707/10
5,732,212 A * 3/1998 Perholtz et al. ............. 709/224
6,098,028 A 8/2000 Zwan
6,330,005 B1 * 12/2001 Tonelli et al. ............... 715/735

FOREIGN PATENT DOCUMENTS

EP 1 128 600 8/2001

OTHER PUBLICATIONS

Tektronix Protocol Analyzers, "K1297/K1205 Series Protocol Tester", 2FW-15355-0, Feb. 8, 2002, 2 pages, website product information, www.tektronix.com/mobile, Copyright 2002.
"K1297/K1205 Series Protocol Tester, GPRS Software", Sep. 20, 2002 Tektronix, Inc. website: www.tektronix.com/mobile.

* cited by examiner

*Primary Examiner*—Wilbert L Starks, Jr.
(74) *Attorney, Agent, or Firm*—Francis T. Gray; Michael A. Nelson

(57) ABSTRACT

Configuration of a measurement task on a protocol tester includes displaying a problem field on a display device, the problem field having several network elements of a telecommunication network; graphically activating one of the network elements by a user; displaying different measurement tasks on the display device which are possible with respect to the activated network element; graphically selecting one of the measurement tasks by the user; and entering further parameters for the configuration of the measurement task, proceeding from one level of the network element level by level in lower levels, with the parameters not specified by the user being occupied by standard values.

15 Claims, 3 Drawing Sheets

CONFIGURATION OF A MEASUREMENT TEST ON A PROTOCOL TESTER

BACKGROUND OF THE INVENTION

The present invention relates protocol analysis, and more particularly to the configuration of a measurement task on a protocol tester.

The configuration of measurement tasks in the environment of telecommunication technology requires a multitude of information which is complex and often difficult to summarize or adjust. This proves particularly disadvantageous when a user is not very familiar with the details and the dependencies of the configuration parameters within a multi-layered measurement system. Under prior art, the information required for the configuration of a measurement task is queried in a sequence that is often not understood by the user. If the details provided about this are contradictory, if they contain errors or if they are incomplete, then error messages are displayed. An example of a measurement task is the monitoring of an interface of a GPRS network where the user has to appropriately configure the physical interface available in the protocol tester. This requires entries to be made about the data transfer rate, the terminating resistor, the clock rate, the framing and the type of coding of the bits, etc. The protocol stack used on an interface, such as a Gr interface, has to be configured by the user right to the level on which the monitoring is desired. To this end a suitable protocol stack must be selected from an unsorted quantity of some 200 to 400 protocol stacks. This requires a detailed knowledge of the environment of the measurement task. The likelihood of incorrect entries and incorrect configurations is relatively high.

Under the prior art, configuration is therefore "bottom up" by way of the entry of details on the bottom-most, or physical layer, level. As a consequence of the specification of the physical properties the network topology elements or interfaces on the upper-most, or application layer, level then result. For the specification of an RNC (radio network controller) in a UMTS network, for example, approximately 10 parameters have to be entered. From the 10 parameters entered, it is then clear in the upper-most level that an RNC is to be defined. This is laborious, time-consuming and error-prone.

What is desired is to have a protocol tester support a user in the configuration of measurement tasks in the environment of telecommunication technology in order to minimize the number of incorrect entries.

BRIEF SUMMARY OF THE INVENTION

Accordingly the present invention provides configuration of a measurement task on a protocol tester by performing the configuration of the measurement task "top down". To this end a user does not enter at the detail level, but at his problem field, i.e. the level of a telecommunication network plan. In order to prevent the user from having to make adjustments for every triviality at the detail level, these are assigned standard values. This is where available expert knowledge is provided to support the user in the configuration of the measurement task. If desired, these standard values may be modified by the user at the corresponding entry level. The user thus is at the level that reveals the problems and tasks. To this end the user's problem field is presented visually, with the expert knowledge being integrated in the telecommunication network plan. If the measurement task is selected from the problem field, then additional information for further configuration steps immediately becomes available. The user therefore does not have to have any knowledge of this information, as it is acquired by relating the expert knowledge to current system parameters. The flood of information for the user is thus minimized, i.e. the user is "guided" through the configuration of the measurement task.

The objects, advantages and other novel features of the present invention are apparent from the following detailed description when read in conjunction with the appended claims and attached drawing.

DETAILED DESCRIPTION OF THE INVENTION

Figure 1:
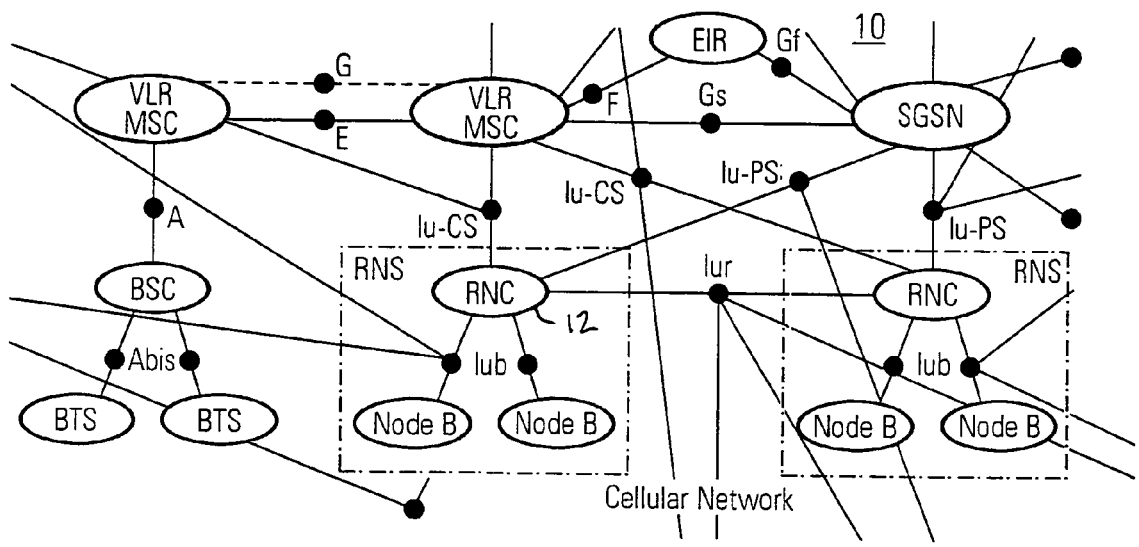
FIG. 1 is a plan view of a visual network plan for a UMTS telecommunication network with various network elements and interfaces.

The present invention may be applied in combination with co-pending European Patent Application Serial No. 02 025 494.2 which is entitled "Method for Adapting a User Interface on a Display Device of a Protocol Tester and Protocol Tester for Performing the Method" and which is incorporated herein by reference in its entirety.

A user, who in principle only knows the problem to be solved, is initially supported by a protocol tester according to the present invention in finding of the problem. To this end a problem field is presented to the user and in this context it is possible for the user with the support of the protocol tester to configure a measurement task. Incorrect and unnecessary inputs, which are not meaningful for the measurement task, are dispensed with.

Standard values are meaningful default values which cover as high a percentage of usual configurations as possible, for example between 60 and 80 percent. Preferably, the problem field is displayed as a visual network plan and/or as a pop-up menu. A network element may be a node or an interface. Preferably, the measurement tasks from which the user selects include such tasks as monitoring, call tracing, simulation, emulation, statistical evaluation of signalling flows, recording of data, conformance test, regression test, load test and error tolerance test, for examples.

If the user selects the monitoring measurement task the user may then specify which interfaces to monitor for the task. Then the user may specify which protocols to monitor for the task. In order to further facilitate for the user the configuration of the measurement task, the elements including the measurement task, the interfaces, the protocols, etc. which are eligible for configuration of the measurement task by the user, may be displayed in a visually different way on the display device, particularly through another color, than elements the user may still purchase or elements which are not offered or elements the user may purchase online. This ensures that the user only configures those measurement tasks which may actually be executed with the protocol tester. Incorrect configurations are thereby reliably prevented.

In the configuration of the measurement task a protocol is specified that contributes to the solving of the measurement task, the configuration being made via graphically selecting using, for example, a check box, a combobox and a pop-up menu. The user may also select versions of the selected protocol, particularly again using the check box, the combobox or the pop-up menu.

After the configuration of the measurement task by the user, the protocol tester configures itself hardware-wise with regard to the configured measurement task. This involves setting corresponding terminating resistors, clock rates, data transfer rates, framing etc. The standard values are preferably determined by the manufacturer and predetermined in the protocol tester. The standard values may be modified by the user.

In order to further facilitate the configuration of the measurement task, during the selection of the measurement task those measurement tasks already configured in the past also are presented to the user on the display device for selection and/or modification. If, for example, only a few parameters have to be changed in the current measurement task compared with the measurement task already configured, then this saves a great deal of time.

Referring now to FIG. 1, a visual network plan 10 of a UMTS network with network elements and interfaces is shown, as is known to a person skilled in the art. The network elements are marked by ellipses, e.g. BTS (Base Transceiver Station), BSC (Base Station Controller), MSC (Mobile Switching Center), SGSN (Serving GPRS Support Node), Node B, VLR (Visitor Location Register), RNC and EIR (Equipment Identity Register). The interfaces are marked by filled circular surfaces located between the network elements, for example A, Abis, E, G, F, Gf, Gs, Iu-CS, Iu-PS, Iur, Iub. The visual network plan shown on the display device represents a detailed view of a large basic network plan. To the extent that the elements and interfaces for which the user wants to configure a measurement task are not shown, the user may shift the detailed view, for example to monitor a Gn interface between the SGSN shown and the GGSN (Gateway GPRS Supporting Node), not currently shown. In FIG. 1 the user specifies a network element on which to configure the measurement task. In the present example the user has selected an RNC element 12 and now specifies via an entry window 14, shown in FIG. 2, which measurement task to execute. In the present example the choices for the RNC 12 are to monitor: trace a call; simulate; or test. As indicated by a tick in a check box 16, the user indicates a decision to monitor the RNC 12.

Figure 2:
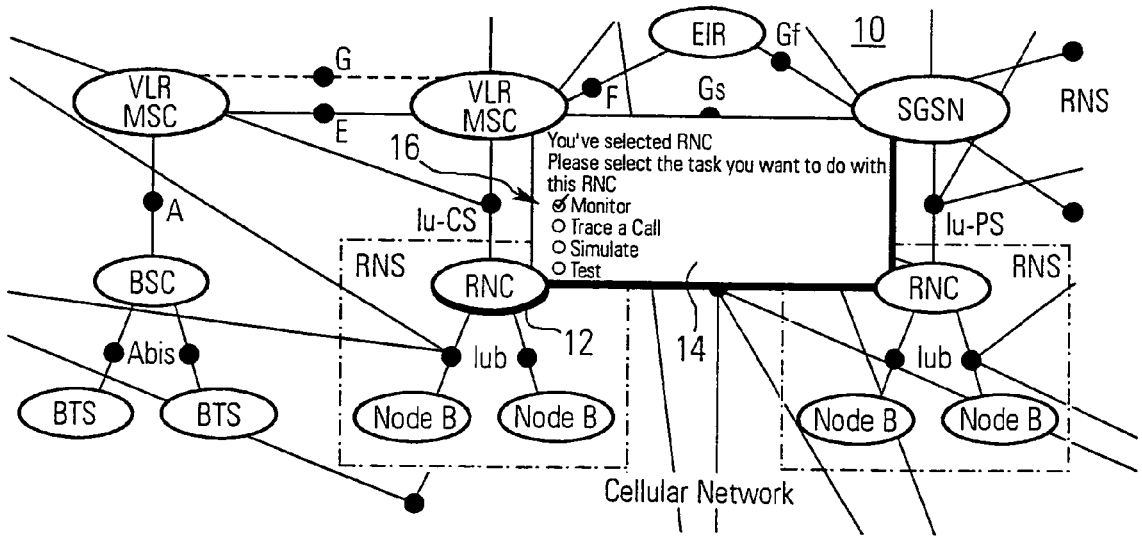
FIG. 2 is a plan view of the virtual network plan of FIG. 1 after selecting a network element according to the present invention.
Figure 3:
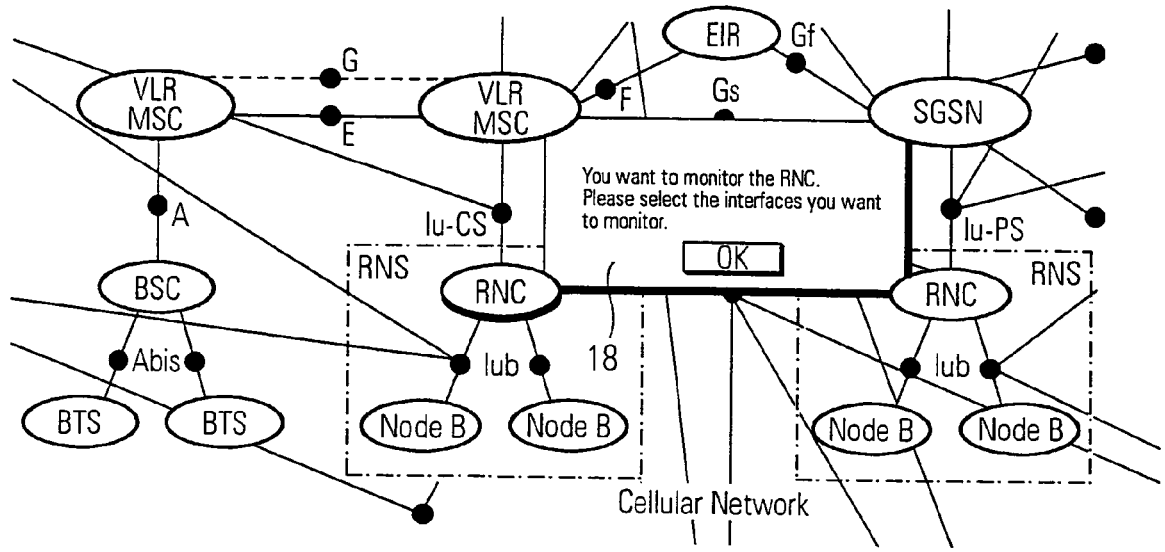
FIG. 3 is a plan view of the virtual network plan of FIG. 2 after selecting a measurement task according to the present invention.
Figure 4:
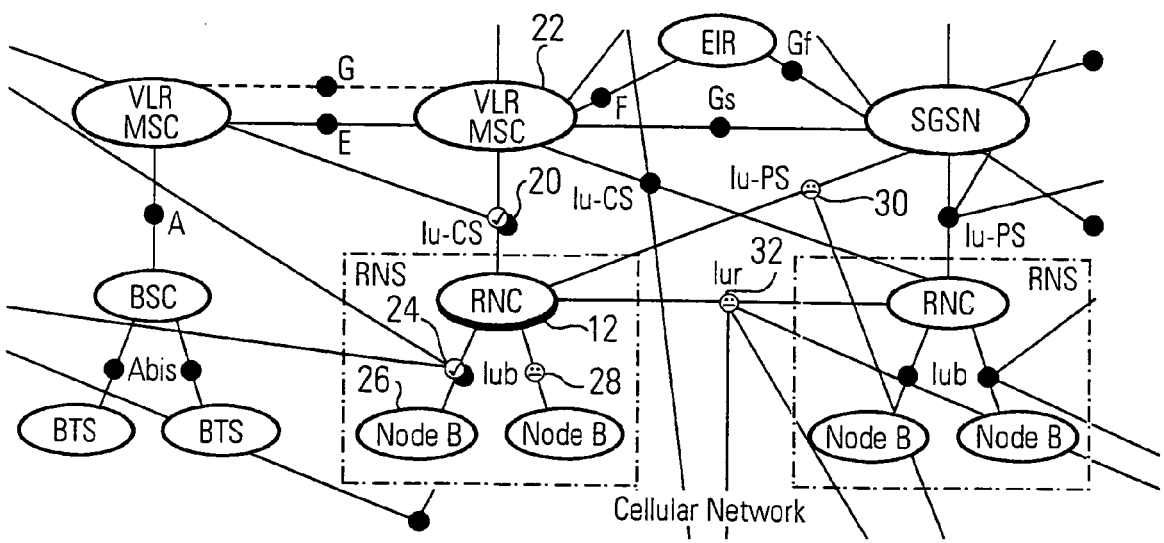
FIG. 4 is a plan view of the virtual network plan of FIG. 3 after identifying which interfaces of the selected measurement are to be monitored according to the present invention.

FIG. 3 shows the visual network plan of FIG. 2 with an entry window 18 in which the user is requested to specify the interfaces to monitor. Clicking then gives the representation shown in FIG. 4 where the user has specified to monitor the Iu-CS interface 20 between the network element VLR MSC 22 and RNC 12, and the Iub interface 24 between RNC and node B 26. The interfaces 28, 30 and 32, which the user has not activated, are marked accordingly.

Figure 5:
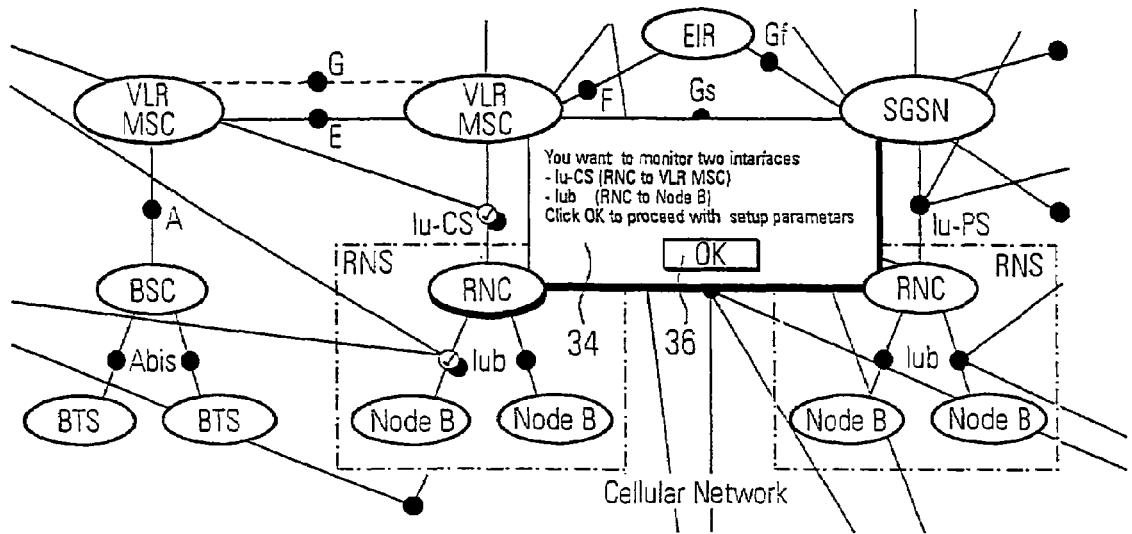
FIG. 5 is a plan view of the visual network plan of FIG. 4 after specifying the interfaces to be monitored according to the present invention.
Figure 6:
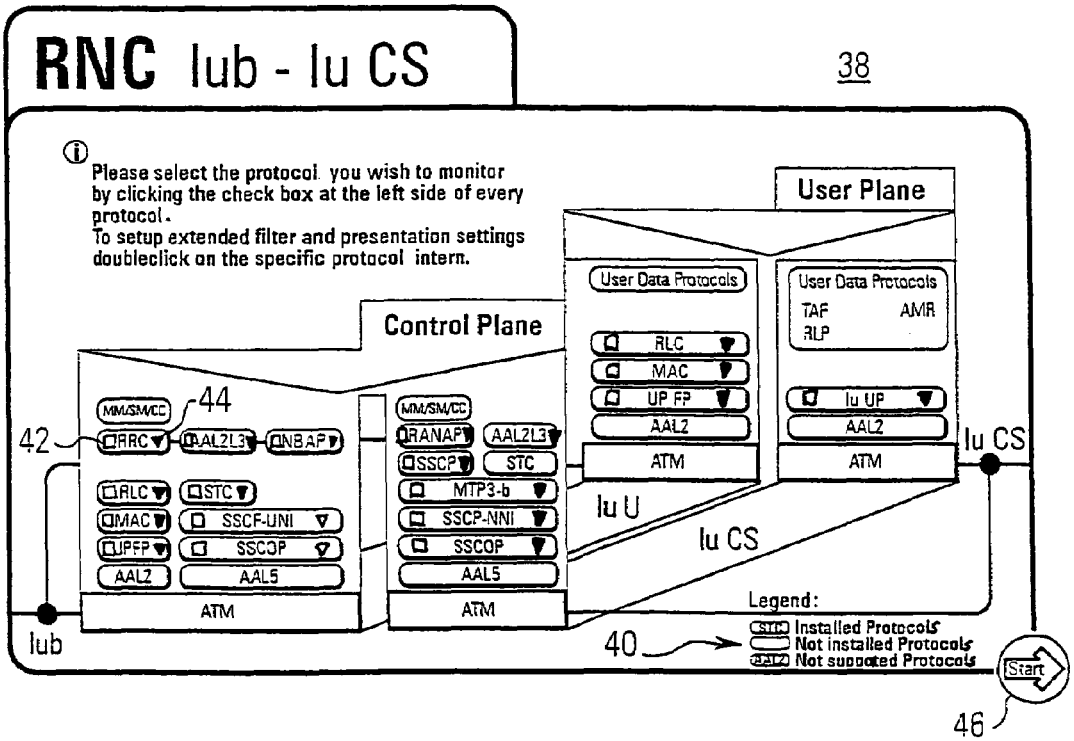
FIG. 6 is a plan view of an entry mask display which summarizes a measurement task configuration and requests that protocols to be monitored be specified according to the present invention.

FIG. 5 shows in an entry window 34 a summary of the measurement task configuration which shows that the user wants to monitor two interfaces, namely the Iu-CS interface between the RNC and the VLR MSC and the Iub interface between the RNC and node B. By clicking on a button 36 the user confirms this configuration and is presented in a next step with a user interface 38, as shown in FIG. 6. Using the user interface 38 the user may specify which protocols are to be monitored. In legend 40 it is pointed out that the different graphic presentations are linked to different meanings: the protocols shown dark are installed protocols; the protocols shown light are protocols not installed which, however, may still be purchased; and the protocols shown mid-grey are unsupported protocols, i.e. protocols which cannot be purchased. On the left of each protocol a (square) check box is provided, such as check box 42, which may be clicked by the user to indicate the desire to monitor that protocol. Using a downward-facing triangle 44 for the various protocols, different protocol variants may be selected. By double-clicking on the respective protocol, filter functions and presentation settings may be entered. Via a Control Plane only network-internal messages are exchanged, while the actual useful data, such as speech data, e-mails, etc., are transmitted via a User Plane. The RNC is located between both stacks and transmits from the relevant left stack to the relevant right stack and vice versa. By clicking on a start icon 46 the protocol tester is automatically configured to the measurement task specified by the user and changes into the monitoring mode.

Other measurement tasks may include, for example, the following:

Recording: Having selected the measurement task "Recording", the user is supported in the configuration of the recording file, e.g. with regard to name, mode, size, duration. Other configurations, e.g. a configuration of the hardware, may be performed as described above for the monitoring. However, this is optional, because otherwise the default settings are used.

CallTrace: Having selected the measurement task "Call-Trace", the user is requested to enter the phone numbers to be searched for and the number type (for example IMSI=International Mobile Subscriber Identity, Called Party Number, IP address). Other configuration possibilities are as described above for "Recording".

LoadTest: Having selected the measurement task "Test" for a network element, the user is requested to name the interfaces to be tested under load. Afterwards, the user may specify the load to be tested in per cent or in other meaningful units (e.g. number of messages, call set-ups or transfers per unit of time). Next, a test scenario may be selected, for example by way of a test sequence description, particularly by specifying the sequence of the messages. Optionally a scenario may be configured manually in detail. Other configuration possibilities are as described above for "Recording".

Thus the present invention provides configuration of a measurement task on a protocol tester which includes displaying a problem field on a display device, the problem field having several network elements of a telecommunication network; graphically activating one of the network elements by a user; displaying different measurement tasks on the display device which are possible with respect to the activated network element; graphically selecting one of the measurement tasks by the user; and entering further parameters for the configuration of the measurement task, proceeding from one level of the network element level by level in lower levels, with the parameters not specified by the user being occupied by standard values.

What is claimed is:

1. A method of configuring a protocol tester to perform a measurement task comprising the steps of:
   a) displaying a problem field on a display device of the protocol tester, the problem field having a plurality of network elements for a telecommunication network;

b) graphically activating one of the network elements;
c) displaying a plurality of measurement tasks on the display device which are possible with respect to the activated network element;
d) graphically selecting one of the measurement tasks;
e) entering parameters level by level in lower levels starting from a level of the activated network element, with the parameters not specified by the user being occupied by standard values; and
f) configuring the protocol tester to perform the selected measurement task on the activated network element using the specified parameters.

2. The method according to claim 1 wherein the problem field is displayed as a visual network plan.

3. The method according to claim 1 wherein the problem field is displayed as a pop-up menu.

4. The method according to one of claims 1-3 wherein the activated network element is selected from the group consisting of a node and an interface.

5. The method according to claim 4 wherein the measurement task is selected from the group consisting of monitoring, call tracing, simulation, emulation, statistical evaluation of signalling flows, recording, conformance test, regression test, load test and error tolerance test.

6. The method according to claim 5 further comprising when monitoring is selected as the measurements task the step of specifying at a next level which interfaces to monitor.

7. The method according to claim 6 further comprising the step of specifying on the next level which protocols to monitor.

8. The method according to claim 1 further comprising the step of displaying the network elements, including the measurement task, the interfaces, and the protocols which are eligible for configuration of the measurement task, in a visually different way on the display device than network elements still purchasable or network elements which are not offered or network elements purchasable online.

9. The method according to claim 1 further comprising the step of specifying in the configuring of the measurement task a protocol that contributes to solving the measurement task, with the configuring being made via graphical selection from the group consisting of a check box, a combobox and a pop-up menu.

10. The method according to claim 9 further comprising the step of selecting different versions of the selected protocol by graphical selection from the group consisting of the check box, the combobox and the pop-up menu.

11. The method according to claim 1 further comprising the step of executing configuration of the protocol tester hardware-wise according to the configured measurement task.

12. The method according to claim 1 wherein the standard values are predetermined in the protocol tester.

13. The method according to claim 1 further comprising the step of during the selection of the measurement task offering previously configured measurement tasks on the display device for selection.

14. The method according to claims 1 or 13 further comprising the step of during the selection of the measurement task offering previously configured measurement tasks on the display device for modification.

15. A protocol tester comprising:
means for displaying a problem field, the problem field having a plurality of network elements for a telecommunication network;
means for graphically activating one of the network elements;
means for displaying a plurality of measurement tasks of the protocol tester which are possible with respect to the activated network topology element;
a storage device in which standard values for parameters are stored, which standard values may serve for the configuration of the measurement task;
means for graphically selecting one of the measurement tasks;
means for entering further parameters level by level in lower levels staffing from a level of the activated network element, with the parameters not specified by the user being occupied by standard values; and
means for configuring the protocol tester to perform the selected measurement task on the activated network element using the specified parameters.

* * * * *